(No Model.)
J. A. ESPITALLIER.
BICYCLE.
No. 580,040. Patented Apr. 6, 1897.
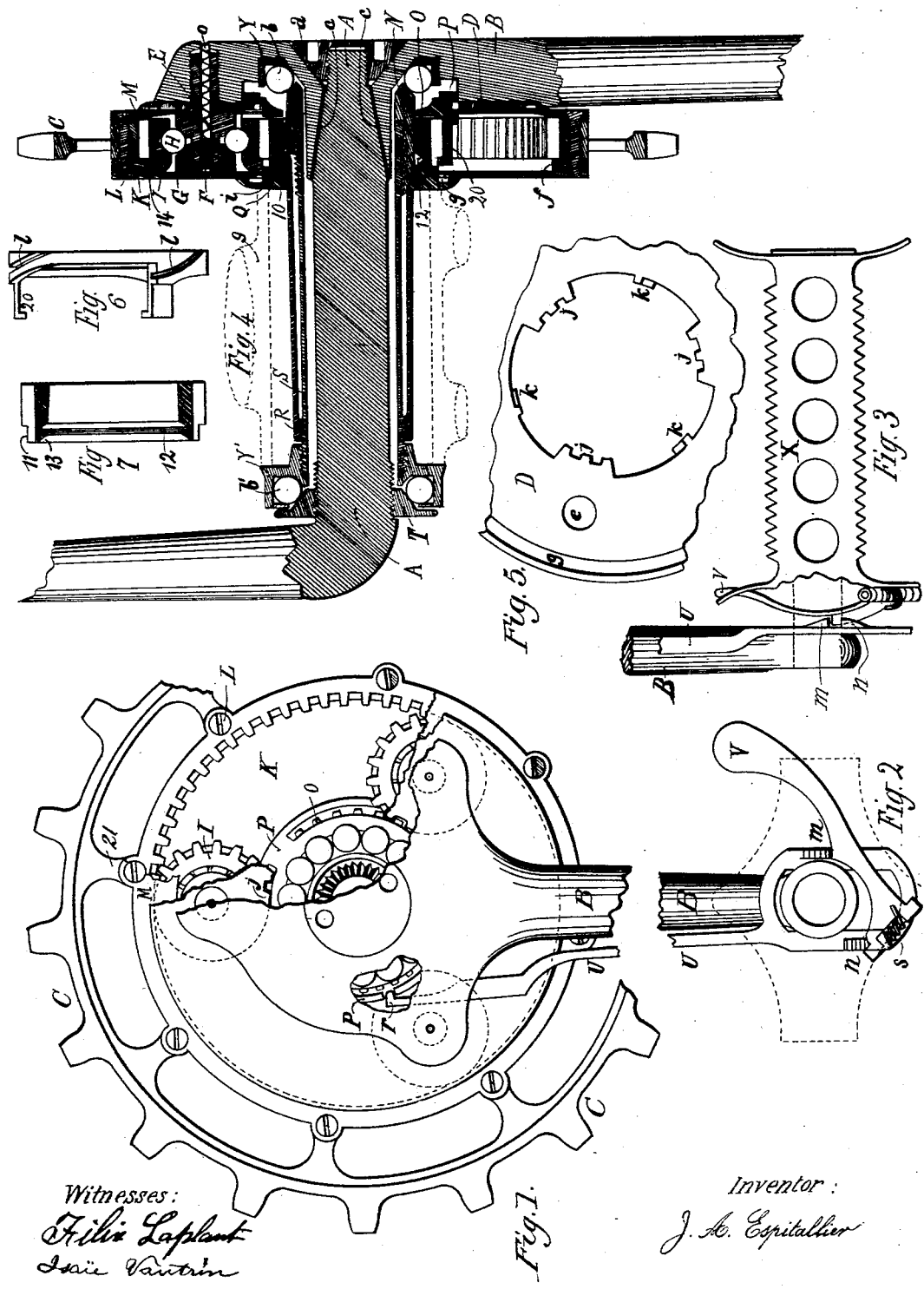
Witnesses:
Félix Laplant
Isaïe Vautrin
Inventor:
J. A. Espitallier

UNITED STATES PATENT OFFICE.

JOHN ANDREW ESPITALLIER, OF CHICAGO, ILLINOIS.

BICYCLE.

SPECIFICATION forming part of Letters Patent No. 580,040, dated April 6, 1897.

Application filed July 30, 1896. Serial No. 601,036. (No model.)

*To all whom it may concern:*

Be it known that I, JOHN ANDREW ESPITALLIER, a citizen of the Republic of France, residing at Chicago, in the county of Cook and State of Illinois, have invented a new and useful Improvement in Bicycles, of which the following is a specification.

This invention relates to bicycles.

The object of the invention is to provide a construction of change-speed running-gear for bicycles whereby the speed may be increased or decreased at will.

Another object of the invention is to improve and render more efficient and durable the running-gear of bicycles.

Other objects of the invention will more fully hereinafter appear.

The invention consists, substantially, in the construction, location, and relative arrangement of parts, all as will be more fully hereinafter set forth, as shown in the accompanying drawings, and finally pointed out in the appended claims.

Reference is had to the accompanying drawings and to the various views and reference-signs appearing thereon, and wherein—

Figure 1 is a side view, parts being broken out, of the chain-sprocket and one of the crank-arms, showing a mechanism for driving said sprocket and embodying the principles of my invention. Fig. 2 is a broken detail view of the end of the crank-arm, the pedal being indicated in dotted lines, showing a form of means embodying my invention for changing automatically from a high to a low speed gearing or from a low to a high speed gearing at will. Fig. 3 is a broken detail view, in side elevation, of the construction shown in Fig. 2. Fig. 4 is a broken view, in central longitudinal section, of a form of change-speed gearing embodying the principles of my invention. Fig. 5 is a detached detail broken view of the gear-plate for locking the gearing to the crank. Fig. 6 is a detached detail, in edge view, of the gear-shifting cam-ring. Fig. 7 is a detached view, in transverse section, of the shifting-gear.

The same part is designated by the same reference-sign wherever it occurs throughout the several views.

In the drawings reference-sign A designates the crank-axle, and may be formed integral with or to which may be secured in any suitable or convenient well-known manner one of the crank-arms. In the form shown, to which, however, I do not desire to be limited or restricted, the crank-axle is formed integral with the crank-arm 8. Reference-sign B designates the other crank-arm and is provided at the axle end thereof with a boss or hub, as shown, which hub or boss is provided with a central cone-shaped passage adapted to receive therethrough the conical end of the axle A, the said passage and the conical end of the axle being provided with corresponding teeth or grooves arranged to interlock with each other, as clearly indicated at *c*, Figs. 1 and 4. A threaded screw-cap *a*, engaging the threaded end of the axle, serves to maintain the parts so far mentioned in assembled relation.

Reference-sign S designates the hub for the reception of the axle A. In the form shown this hub comprises a sleeve loosely mounted to be received upon the axle and is provided with peripheral screw-threads at each end thereof. An internally-threaded sleeve or nut N is screwed upon the threaded portion of sleeve S, at one end thereof, and the extreme outer end of said sleeve or nut N is beveled off, as shown, to form a bearing against the balls *b*, said balls being confined between the said beveled end of said sleeve or nut N and a hardened-steel plate Y, inserted in a recess formed in the hub or boss of crank-arm B, as clearly shown. Upon the opposite end of said sleeve S is mounted an internally-threaded sleeve or nut Y', constructed to receive the balls *b*, said balls forming a bearing for a nut T, mounted upon the axle A. Also mounted on the sleeve S are the spring-arms R, having enlarged heads 10, the purpose of which will be more fully explained hereinafter. The hub or sleeve S is adapted to be received in the bore of the hanger of the bicycle-frame in the usual or any well-known or convenient manner, as indicated in dotted lines at 9, Fig. 4. Loosely mounted upon the sleeve N, to rotate and slide back and forth freely thereon, is a gear-wheel or pinion O, having peripheral spur-teeth, the inner ends of which are cut away or reduced in length, as indicated at 11, Fig. 7.

By reference to Figs. 4 and 7 it will be seen that the external surface of the sleeve N is slightly conical and that the bore of the gear or pinion O is also slightly tapering. The object of this construction is to remove said pinion O from actual contact with sleeve N in the lateral movements of said pinion back and forth upon said sleeve, as will presently be more fully described, said pinion O being supported by the gears I and plate D, as will presently be more fully explained.

P designates what I shall designate a "shifting" cam-ring, and said ring is arranged to be received in a seat or recess formed in the boss or hub of crank-arm B, as clearly shown. This cam-ring is arranged adjacent to gear-wheel O and is provided with arms 20, arranged, when the parts are assembled, to overreach the spur-gear teeth of said gear-wheel and having the hooked ends thereof arranged to be received in the shoulder formed by cutting away or depressing the inner ends of the gear-teeth of gear O. Of course it will be understood that any other suitable or convenient method of connecting said gear O and cam-ring P for coincident lateral movement would fall within the scope and spirit of my invention, and therefore I do not desire to be limited or restricted to the exact form of construction shown. The cam-ring is provided with peripheral cam-grooves $l$, (see Fig. 6,) adapted to receive lugs or projections $k$, formed on plate D. From this construction it will be seen that when said ring P is rotated axially a lateral movement is imparted thereto, and that by reason of the engagement of said ring with gear O a coincident lateral movement or shifting is imparted to said gear.

The boss or hub of crank-arm B is provided with a series of threaded sockets, radially arranged, as shown, and adapted to receive the threaded ends of plugs E. A cap-piece G, internally threaded, is mounted on the opposite ends of said plugs E, which are also threaded, as shown, said cap-pieces being in the form shown held in place by the screw-caps F. The outer ends of cap-pieces G are beveled, and coöperating with an oppositely-faced beveled shoulder formed on plug E form a seat to receive the antifriction-balls H, constituting a ball-bearing for the hubs of spur gear-wheels I.

The plate D, above referred to, which is arranged to engage the cam-grooves $l$ in the periphery of cam-ring P, is held in place against the face of the enlargements formed in the hub B, in which are formed the sockets for receiving the plugs E and a shoulder formed on said plugs, said plugs passing through perforations formed in said plate, and consequently said plate revolves axially with the revolution of the crank-arm and carries with it in an orbital path the axes of gears I. This plate also forms part of the inclosing casing of the mechanism and prevents dust and dirt from gaining access thereto. Upon the inner periphery of the central opening in plate D, I provide a series of teeth $j$, as shown in Fig. 5, and arranged to engage and to be disengaged from the spur-teeth of gear O, according as said gear is shifted or moved laterally in one direction or the other. When an engagement between these teeth and said gear is effected, said gear and plate revolve in unison with each other and with the crank-arm B, and correspondingly when said teeth and gear are disengaged said gear and plate revolve independently.

The rim J of the chain-sprocket is provided with inwardly-projecting gear-teeth, as shown, and the series of gears I are arranged to constantly mesh with the gear-teeth on said rim J and also with the gear O, as clearly shown. From this construction it will be seen that when gear O is locked, as above explained, to revolve in unison with plate D and the crank-arm the axial rotation of gears I is arrested, and hence all of said parts move or revolve in unison with the crank-arm, and hence the chain-sprocket C travels or rotates merely at the same speed as the crank-arm.

Q designates a sleeve or hub which, if desired, may form part of the fixed hanger of the bicycle-frame in which the axle A is journaled, and on the outer face thereof I provide projecting gear-teeth, (indicated in solid black at $i$,) said gear-teeth arranged to intermesh with the gear-teeth of gear O when said gear is shifted laterally, as above explained, and out of position to be engaged by the gears $j$ of plate D. It being understood that sleeve or hub Q is fixed, it will be seen that when the teeth thereon are in engagement with the teeth of gear O said gear O is locked against rotation. Under these conditions when the crank-arm B is actuated by the foot of the rider the series of gears I are carried in an orbital path around said gear O, and hence by reason of the constant mesh of said gears I with said gear O are axially rotated, and by reason of the engagement of said gears I with toothed rim J of the chain-sprocket said chain-sprocket is revolved. Now by making the gears I of a greater or smaller diameter than gear O the relative speed of rotation of the chain-sprocket and the axle or crank is correspondingly changed. In the form shown I make the gears I of smaller diameter than gear O, say of such a size that one complete traverse of its orbit of each of said gears I about gear O, which, it will be remembered, is fixed against rotation under the conditions now being described, will effect more than one complete axial rotation of said gears I, and hence a more rapid rotation of the chain-sprocket than that of the crank-axle. Thus by varying the relative sizes of said gears I and O any desired degree of relative increase or decrease of speed of the chain-sprocket over that of the driving axle or crank may be secured.

By reference to Figs. 4 and 7 it will be seen that the inner surface of gear O is provided with a groove 12, having sloping or inclined walls. It will also be seen that the inner edge of the said gear is also beveled, as at 13. The object of this construction is to accommodate the enlarged head 10 of spring-arms R, to the end that when said gear O is shifted laterally into position to engage the gears $j$ of plate D said gear is held in such position by the ends of spring-arms R abutting against the inner edge 13 of said gear O, and when said gear O is shifted laterally to be disengaged from plate D and to be engaged by the hanger or bracket the ends of said spring-arms snap into the groove 12 and maintain effectively the desired engagement, the inclined wall 13 and the inclined walls of groove 12 facilitating the engagement and disengagement of said spring-arms, as will readily be understood.

In order to effect a renewal of the chain-sprocket readily in case of breakage without necessitating a renewal or replacement of the entire mechanism, I make the part C of said chain-sprocket in a separable piece, as shown, which can be readily removed and renewed should a necessity therefor arise. To this end I provide said separable part C with radially-arranged inwardly-projecting arms 21, and each arm 21 is provided with a semicircular seat upon the inner surface of its end, arranged to register with a similar seat formed in the outer periphery of rim J. Clamping-screws L are arranged to pass through projecting lugs on a clamping-ring M and through the circular perforations formed by the registering semicircular seats in the arms 21 and rim J, and finally into threaded sockets formed in the edge of an inclosing cap-plate K, as clearly shown, thereby firmly and compactly securing the several parts together.

In practice I prefer to use half-round clamping-screws L, whereby by turning said screws to suitable positions and partially rotating the part C of the chain-sprocket to clear the arms 21 thereof from the screws and the projections on clamping-plate M said part C may be readily slipped off and replaced by a new one.

In order that the bearing-surface of every rotating part may be so constructed and arranged to reduce friction to the lowest possible degree and at the same time to avoid as much as possible expense and extra weight, I provide the gears I with a smooth peripheral shoulder, as at 14, upon which flange $f$ of cap-plate K is arranged to bear, thereby not only affording said plate an efficient bearing and support, but also forming a rolling contact or bearing whereby the friction thereof is reduced to the lowest possible degree.

In order to provide every safeguard against the admission of dust and dirt to the operating parts of the gearing, I provide grooves or seats $g$ in plates K and D, adapted to receive strips of felt or the like at the joints between said plates and adjacent surfaces; but of course it will be understood that this feature may be omitted, if desired.

In order to permit and facilitate the oiling of the parts, I form the plugs E with a central channel and arrange therein a spring 15, arranged to press a small ball $o$ into an orifice formed through the shell of the hub or boss of crank-arm B.

I will now describe the means whereby cam-ring P may be rotated axially at will in order to effect a shifting of gear O into or out of engagement with the gears of plate D or the gears of sleeve Q, as may be desired, to increase or decrease the relative speed of rotation of the chain-sprocket and axle or crank-arm.

The peripheral rim of cam-ring P is provided with a seat adapted to receive the end or a portion of the end $r$ of a bar U. By projecting said bar endwise in one direction or the other the said cam-ring is partially rotated or rocked axially in one direction or the other, as may be desired. I have shown a convenient arrangement for effecting the desired object wherein the bar U is projected by the foot of the operator at will. In the form shown I arrange the bar U to extend adjacent and parallel to the crank-arm B, and I provide the outer end thereof with an elongated slot arranged to straddle the hub of the pedal-axle, and also with the oppositely-faced shoulders $m$ $n$ on opposite sides thereof. Pivotally mounted on the pedal is an arm V, arranged to extend out into convenient position to be rocked at will by the foot of the operator. The pivoted arm V is provided with a projection 15, arranged, when said arm is rocked, to engage one or the other of said shoulders $m$ $n$, as the case may be, and effect a longitudinal movement of bar U. A spring S may serve to normally maintain said lever V in a position such as to cause the shoulder 15 thereon to clear the shoulders $m$ $n$. The arrangement, as above described, of the shoulders $m$ and $n$ on opposite sides of the forked or perforated end of bar U causes said lever V to effect a longitudinal movement of said bar in one direction when said lever V is rocked while at the bottom of the stroke of the pedal and in the opposite direction when said lever is rocked at the top or beginning of the stroke. The arm U is held in whichever position to which it may be shifted by means of the engagement of spring-arms R with gear O.

The operation will be fully understood by persons skilled in the art from the foregoing description when taken in connection with accompanying drawings, and is as follows: When it is desired to rotate the chain-sprocket at the same speed as the crank and crank-axle, the rider suitably manipulates the lever V with his foot to project bar U longitudinally, thereby partially rotating cam-ring P. By reason of the engagement of the projections $k$ upon plate D with the cam-grooves $l$ in the cam-ring said ring is moved laterally by the rocking or axial movement imparted thereto by the bar U. This lateral movement of the cam-ring effects a corresponding lateral movement of gear O in a direction to cause the teeth of said gear to engage the gear-teeth *j* on plate D, the gear O being held in such position by the ends 10 of the spring-arms R bearing against the beveled wall 13 of the said gear. The engagement of gear O with plate D locks said gear or pinion O to rotate with said plate, and hence also with the axle and crank. Since the gears I are also mounted on and move with said plate D, it will be readily seen that said gears I are thus locked against axial rotation, and therefore the chain-sprocket, pinion O, axle, and crank all rotate in unison and at the same speed. Now if it is desired to vary the relative speeds of the chain-sprocket and its driving axle and crank the rider again manipulates the lever V to move the bar U endwise in the opposite direction, thereby axially rotating the cam-ring P in a direction opposite to that above described, and hence effecting a lateral movement of said ring, and hence also of pinion O, in a direction such as to disengage said pinion from plate D and to engage the same with the fixed gear-teeth *i* on the portion Q of the hanger or framework. This engagement locks the pinion O against rotation. Now when the axle is rotated, carrying with it the plate D, the gears I, which are in constant mesh with pinion O, are carried orbitally around said pinion, and hence are axially rotated, and therefore, by reason of the variation in the relative sizes of said gears I and O, the chain-sprocket is rotated at a speed greater or less, as the case may be, than that of the crank and axle.

By use of my invention a rider can at will and by the mere rocking of his foot change automatically from one speed-gearing to another without arresting his travel. The invention may be readily and easily applied to any standard make of bicycles, tandems, or carriers, or wherever a change-speed is desired, by merely removing the usual crank and chain-sprocket and substituting the gearing of the present invention. The mechanism is strong and durable. It is noiseless, runs without any increase in friction, and is practically dust-proof.

Many changes in the details of construction and relative arrangements of parts would readily suggest themselves to persons skilled in the art and still fall within the spirit and scope of my invention. I do not desire, therefore, to be limited or restricted to the exact details shown and described; but, Having now set forth and explained the object and nature of my invention and a form of apparatus embodying the same, and having described the construction and mode of operation thereof, what I claim as new and useful and of my own invention, and desire to secure by Letters Patent of the United States, is—

1. In a bicycle, a drive-gear and an axle, change-speed gearing intermediate said gear and axle and adapted when manipulated to change the relative speeds of said gear and axle, a bar for manipulating said change-speed gearing, and a lever carried by the pedal and arranged to be rocked by the foot of the rider for actuating said bar, as and for the purpose set forth.

2. In a bicycle, a drive-gear, a crank-axle and crank, a bar provided with an elongated slot, said bar arranged adjacent to the crank and having the slot therein arranged to straddle the pedal-axle, a lever mounted on the pedal in position to be engaged and rocked by the foot and adapted to engage and actuate said bar, and means actuated by said bar for varying the relative speeds of said drive-gear and axle, as and for the purpose set forth.

3. In a bicycle, a drive-gear, a crank-axle and crank, a bar provided with shoulders and arranged adjacent to said crank, a lever mounted on the crank-pedal and arranged to be rocked into position to engage the shoulders on said bar whereby said bar is moved, and means actuated by the movement of said bar for varying the relative speeds of said drive-gear and axle, as and for the purpose set forth.

4. In a bicycle, a drive-gear, a crank-axle and crank, a bar provided with shoulders, and arranged adjacent to said crank, a lever mounted on the crank-pedal, in position to be engaged by the foot of the rider and rocked into position to engage the shoulders on said bar whereby said bar is moved, means for normally maintaining said lever out of the path of said shoulders, and means actuated by the movement of said bar for varying the relative speeds of said drive-gear and axle, as and for the purpose set forth.

5. In a bicycle, a drive-gear and an axle, change-speed gearing intermediate said gear and adapted when manipulated to change the relative speeds of said gear and axle, a bar for manipulating said change-speed gearing, and means carried by the pedal and arranged to be rocked by the foot of the rider for actuating said bar; as and for the purpose set forth.

In witness whereof I have hereunto set my hand this 27th day of July, 1896, in the presence of the subscribing witnesses.

JOHN ANDREW ESPITALLIER.

Witnesses:
I. VANTRIN,
S. E. DARBY.